United States Patent
Vulkan et al.

(10) Patent No.: US 10,850,609 B2
(45) Date of Patent: Dec. 1, 2020

(54) SOLENOID ASSEMBLY FOR A VALVE

(71) Applicant: RAVAL A.C.S. LTD., Beer-Sheva (IL)

(72) Inventors: Omer Vulkan, D.N. Hanegev (IL);
Denis Kleyman, Mabu'im (IL);
Vladimir Olshanetsky, Beer Sheva (IL)

(73) Assignee: RAVAL A.C.S. LTD., Beer-Sheva (IL)

( * ) Notice: Subject to any disclaimer, the term of this patent is extended or adjusted under 35 U.S.C. 154(b) by 329 days.

(21) Appl. No.: 15/776,683

(22) PCT Filed: Nov. 21, 2016

(86) PCT No.: PCT/IL2016/051247
§ 371 (c)(1),
(2) Date: May 16, 2018

(87) PCT Pub. No.: WO2017/090029
PCT Pub. Date: Jun. 1, 2017

(65) Prior Publication Data
US 2018/0370351 A1    Dec. 27, 2018

Related U.S. Application Data

(60) Provisional application No. 62/258,811, filed on Nov. 23, 2015.

(51) Int. Cl.
*B60K 15/035* (2006.01)
*B60Q 9/00* (2006.01)
(Continued)

(52) U.S. Cl.
CPC ......... *B60K 15/03519* (2013.01); *B60Q 9/00* (2013.01); *F02M 25/089* (2013.01);
(Continued)

(58) Field of Classification Search
CPC ................................ B60Q 9/00; F02M 25/08
See application file for complete search history.

(56) References Cited

U.S. PATENT DOCUMENTS

| 6,701,784 B1 | 3/2004 | Matusek et al. |
| 9,026,292 B2 | 5/2015 | Lindlbauer et al. |
| 2003/0047232 A1 | 3/2003 | Krimmer et al. |

(Continued)

FOREIGN PATENT DOCUMENTS

| JP | 62137755 U | 8/1987 |
| JP | 2001082262 A | 3/2001 |

(Continued)

OTHER PUBLICATIONS

International Search Report and Written Opinion for International Application No. PCT/IL2016/051247 dated Feb. 17, 2017.

*Primary Examiner* — Kira Nguyen
(74) *Attorney, Agent, or Firm* — Dorsey & Whitney LLP

(57) ABSTRACT

A fuel tank isolation valve (FTIV) is provided, configured for being disposed in fluid flow communication with a fuel tank and a carbon canister of a fuel system, the FTIV including an integrated controller and a solenoid coupled to a valve, the solenoid being movable between a normally closed position in which the valve is closed and prevents fluid communication through a first flowpath through the FTIV, and an open position in which the valve is open and allows for fluid communication through the first flowpath, the integrated controller being configured for generating actuation signals to the solenoid, responsive to parameter signals received from one or more sensors associated with the fuel tank. A sensing system for use with a fuel system is also provided, the sensing system including the FTIV and at least one such sensor. A fuel system is also provided, including a fuel tank and a carbon canister, and also including the sensing system for use therewith.

21 Claims, 9 Drawing Sheets

(51) Int. Cl.
 *F02M 25/08* (2006.01)
 *B60K 6/22* (2007.10)
 *B60K 15/03* (2006.01)
(52) U.S. Cl.
 CPC ........... *F02M 25/0836* (2013.01); *B60K 6/22* (2013.01); *B60K 2015/0319* (2013.01); *B60K 2015/0358* (2013.01); *B60K 2015/03217* (2013.01); *B60K 2015/03256* (2013.01); *B60K 2015/03561* (2013.01); *B60Y 2200/92* (2013.01)

(56) References Cited

U.S. PATENT DOCUMENTS

| | | | |
|---|---|---|---|
| 2004/0089063 A1* | 5/2004 | Matsubara | F02M 25/0818 73/114.41 |
| 2013/0146494 A1* | 6/2013 | Gilpatrick | B60K 15/03177 206/459.1 |
| 2014/0174573 A1 | 6/2014 | Matsunaga et al. | |
| 2014/0294606 A1 | 10/2014 | Anderson | |
| 2015/0032307 A1* | 1/2015 | Lindlbauer | B60K 15/035 701/22 |
| 2015/0122229 A1* | 5/2015 | Dudar | F02M 25/0818 123/518 |

FOREIGN PATENT DOCUMENTS

| | | |
|---|---|---|
| JP | 2003341800 A | 12/2003 |
| JP | 2004156494 A | 6/2004 |
| JP | 2006012692 A | 1/2006 |
| JP | 2008230398 A | 10/2008 |
| JP | 2010181348 A | 8/2010 |
| JP | 2010223687 A | 10/2010 |
| JP | 2012047077 A | 3/2012 |
| JP | 2013155635 A | 8/2013 |
| RU | 2394696 C2 | 7/2010 |
| WO | 2015114618 A1 | 8/2015 |

* cited by examiner

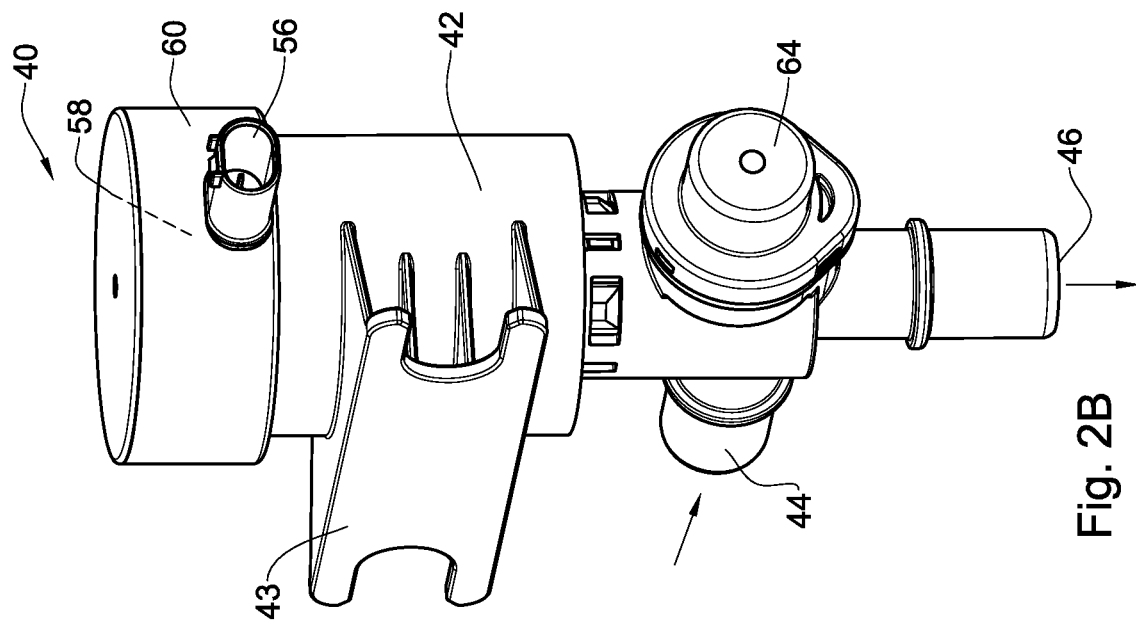
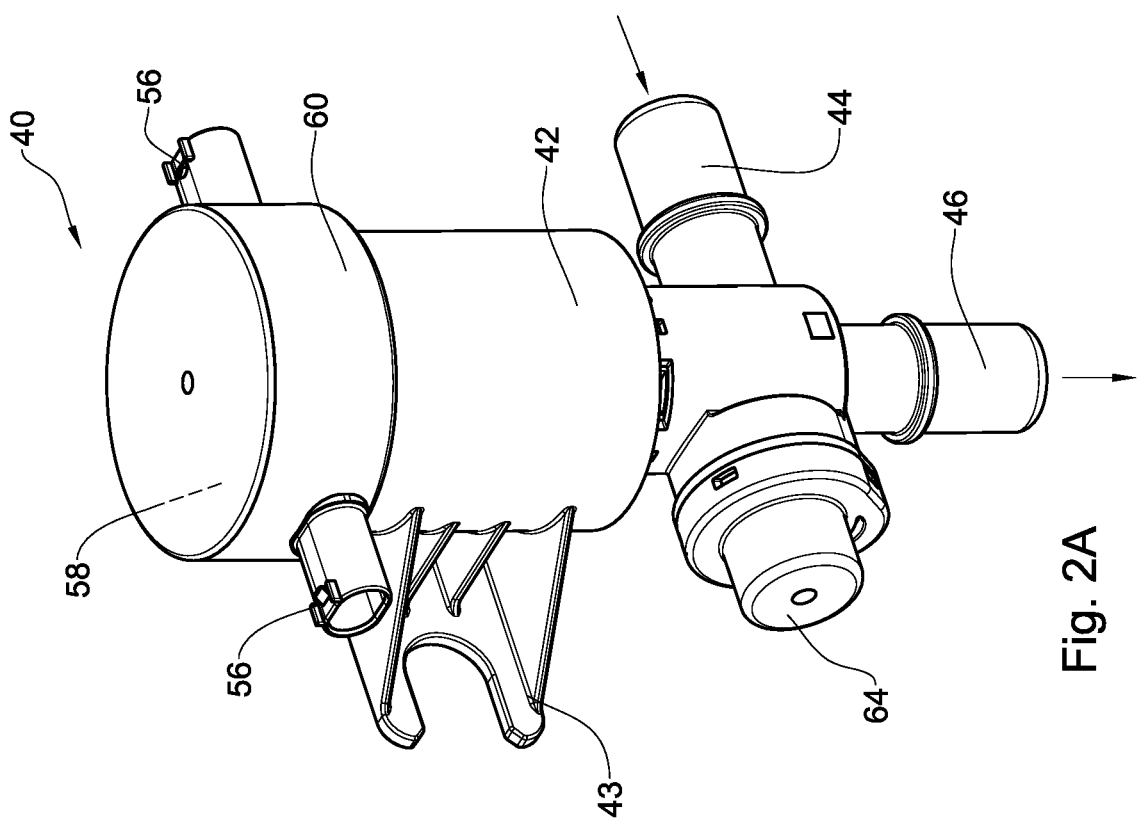

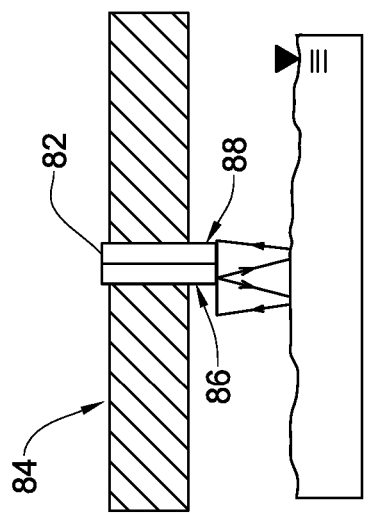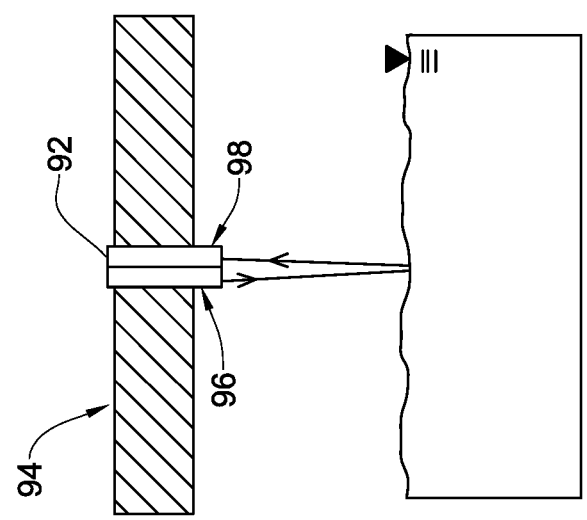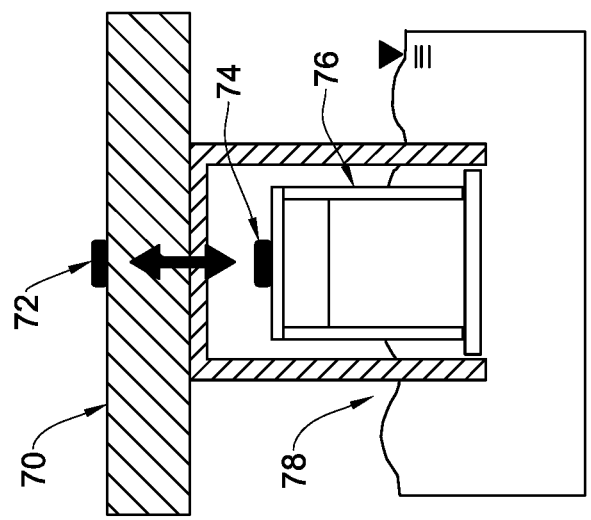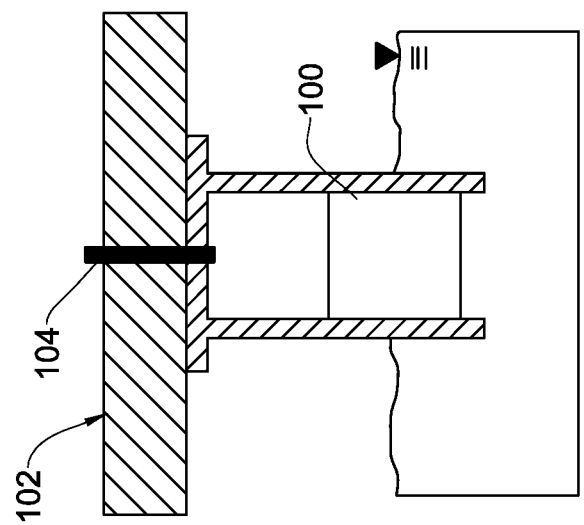

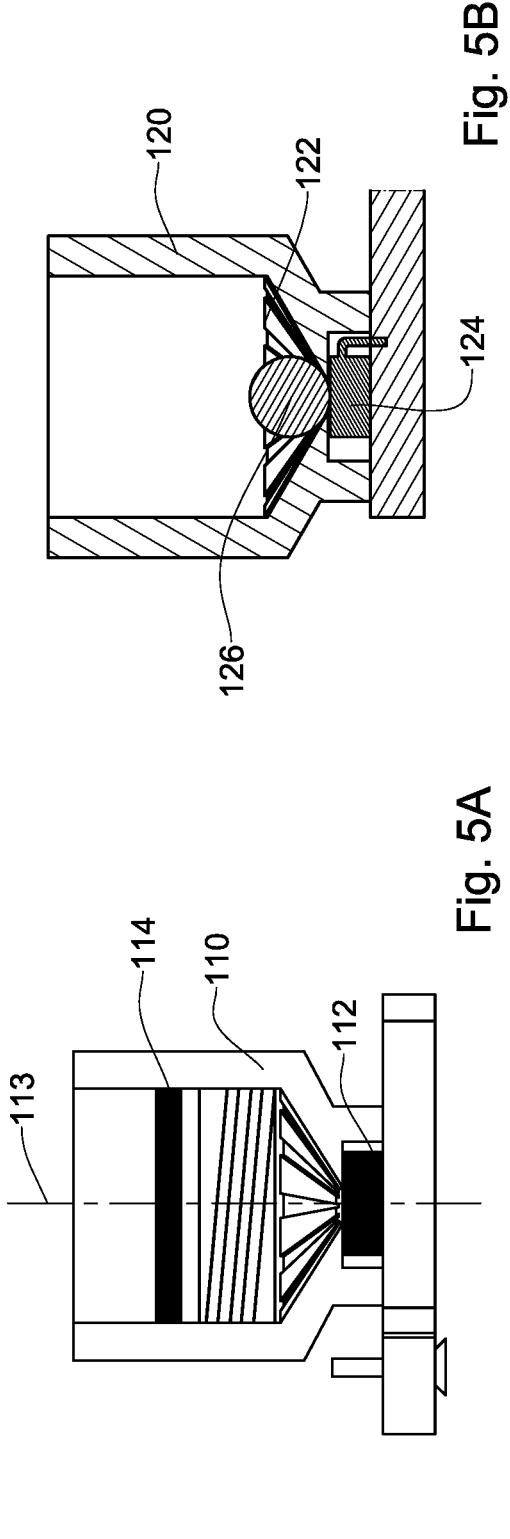

SOLENOID ASSEMBLY FOR A VALVE

TECHNOLOGICAL FIELD

The presently disclosed subject matter relates to fuel tank isolation valves (FTIV), particularly for use with hybrid car systems.

BACKGROUND ART

References considered to be relevant as background to the presently disclosed subject matter are listed below:
U.S. Pat. No. 9,026,292
WO 2015/114618

Acknowledgement of the above references herein is not to be inferred as meaning that these are in any way relevant to the patentability of the presently disclosed subject matter.

BACKGROUND

Some types of vehicles, for example hybrid electric vehicles (HEV) or plug-in hybrid electric vehicles (PHEV), are provided with a sealed fuel system that includes a fuel tank isolation valve (FTIV) between the fuel tank and the carbon filter. The FTIV is biased to, and is normally at, the closed position, and operates to selectively open fluid communication between the tank and the carbon canister. Opening the FTIV allows the pressure in the tank to be controlled by allowing to vent the tank, or to prevent pressure build-up when the tank is being refilled with fuel.

Conventional FTIV are actuated by a solenoid actuator, which has a power requirement threshold for opening, and in which the power consumption remains at this threshold so long as the solenoid actuator (and thus the FTIV) is in the open position, which can be for long periods of tens of minutes, for example. In turn, maintaining the solenoid in the open position at this relative high power level can lead to large power consumption as well as heating of the solenoid actuator and the FTIV.

GENERAL DESCRIPTION

The presently disclosed subject matter is directed to a fuel system for use in conjunction with hybrid electric vehicles (HEVs) or plug-in hybrid electric vehicles (PHEVs), wherein a sealed fuel system is used and comprises a fuel tank isolation valve (FTIV) disposed in fluid flow communication with the fuel tank and a carbon canister.

The FTIV is a normally closed isolation valve and operates to selectively open or close a fluid communication with the fuel tank and the carbon canister, configured for facilitating controlled fuel vapor flow into the canister and wherein opening the FTIV depressurizes the tank, allowing the tank to be vented and facilitating refueling the tank.

Thus, the FTIV disposed in fluid communication with the fuel tank and the carbon canister acts to proactively seal flow into the carbon canister, thus results in reducing the amount of residual burnt fuel components within the carbon canister, thereby reducing load and improving its overall performance.

According to one arrangement, the FTIV is disposed between the fuel tank and the carbon canister in is thus configured to control fluid flow from the fuel tank to the carbon canister. According to a second arrangement, the FTIV is disposed after the carbon canister and thus controls fluid flow from the fuel tank to the carbon canister and further to the atmosphere.

A fuel system according to the presently disclosed subject matter comprises an FTIV disposed in fluid flow communication with the fuel tank and the carbon canister, said FTIV integrally comprising a normally closed solenoid and an integrated controller.

Under regular conditions, in order to overcome the substantially high pressure within the fuel tank, higher power is required of the solenoid to open, whereby the integral controller is configured for consuming electric power at substantially constant voltage, though often higher than the input voltage provided by the vehicles battery.

The FTIV of the presently disclosed subject matter facilitates reducing electric power consumption by controlling the power applied to the solenoid so that it is activated for a short time span at substantially high power, however sufficient for overcoming said substantially high pressure, and thereafter the electric power drops to a minimum voltage required to maintain the solenoid open, however preventing its overheating and saving on electric power;

According to one particular example, power input of between 9 to 16 volts (provided by the vehicle's battery) was converted to a substantially constant 14 volt power applied for 200 ms. And was then decreased to a substantially constant 5 volt applied for as long as the FTIV is required to remain open.

A fuel system according to the presently disclosed subject matter comprises an FTIV disposed in fluid flow communication with the fuel tank and the carbon canister, said FTIV integrally comprising a normally closed solenoid and an integrated controller; said controller configured for generating closing signal to the solenoid for sealing a fluid flow path through the valve, responsive to parameter signals received from one or more sensors associated with the fuel system.

The arrangement is such that once the FTIV is triggered by a central controller, the integral controller of the FTIV autonomously generates signals to the solenoid, based on to parameter signals received from one or more sensors associated with the fuel system.

An aspect of the presently disclosed subject matter is directed to an FTIV disposed in fluid flow communication with the fuel tank and the carbon canister, said FTIV integrally comprising a normally closed solenoid and an integrated controller; said controller configured for generating a closing signal to the solenoid for sealing a fluid flow path through the valve, responsive to parameter signals received from one or more sensors associated with the fuel system.

Another aspect of the presently disclosed subject matter is directed to a vehicle comprising an FTIV disposed in fluid flow communication with the fuel tank and the carbon canister, said FTIV integrally comprising a normally closed solenoid and an integrated controller; said controller configured for generating closing signal to the solenoid for sealing a fluid flow path through the valve, responsive to parameter signals received from one or more sensors associated with the fuel system.

Another aspect of the presently disclosed subject matter is directed to a vehicle fuel tank system comprising an FTIV disposed in fluid flow communication with the fuel tank and the carbon canister, said FTIV integrally comprising a normally closed solenoid and an integrated controller; said controller configured for generating closing signal to the solenoid for sealing a fluid flow path through the valve, responsive to parameter signals received from one or more sensors associated with the fuel system.

According to the disclosure, a central controller of the fuel system or of the vehicle generates an opening signal to the integral controller of the FTIV, which in turn generates closing signals to the solenoid of the FTIV responsive to parameter signals received from one or more sensors associated with the fuel system.

The central controller will generate an opening signal to the FTIV upon commencing a refueling procedure and for performing target pressure checks. For example, in order to refuel the driver is required to activate an opening signal to the FTIV e.g. by operating a command switch or by opening the fuel door. Once an opening signal is generated to the FTIV, the later will open, so as to reduce pressure within the fuel tank before the fuel cap is removed.

A fuel tank isolation valve (FTIV) according to the disclosure can typically comprise a normally closed bypass valve, configured to override the solenoid for venting the fuel tank at predetermined threshold conditions of vacuum and overpressure. Accordingly, at the event of pressure changes at the fuel tank side of the FTIV exceeding the predetermined pressure threshold boundaries, then the bypass valve will open so as facilitate fluid flow between the fuel tank and the carbon canister so as to regulate pressure within the fuel system.

According to another aspect of the disclosure there is configured a fuel level sensing system wherein the fuel tank comprises a fuel level sensor configured for generating a fuel level parameter signal responsive to fuel level within the tank, said fuel level parameter signal is transmitted to the integral controller of the FTIV, which in turn generates a closing signal to the solenoid of the FTIV.

The fuel level parameter signal is a maximum level filing signal, for over filling prevention/protection. However, the fuel level parameter signal may also be indicative of the fuel level within the fuel tank. The fuel level parameter signal may also be transmitted to a central controller of the vehicle for generating signals representative of fuel level within the fuel tank. The fuel level sensor can be any level sensing arrangement.

According to another aspect of the present disclosure there is configured a roll over detection arrangement, for generating a parameter signal to the integral controller of the FTIV which in turn generates a closing signal to the solenoid of the FTIV at the event of roll-over.

According to another aspect of the present disclosure there is provided a target pressure retention system configured for checking target pressure retention of the fuel tank, during target pressure checkups performed by the central controller. According to this aspect, the fuel tank system is configured with a pressure sensor for generating a pressure parameter signal responsive to pressure within the fuel tank, said pressure parameter signal being transmitted to the integral controller of the FTIV, which in turn generates a respective closing signal to the solenoid of the FTIV, whereupon pressure within the fuel tank is monitored during a target pressure check.

According to another aspect of the present of the disclosure there is provided an anti-corking system.

The term corking denotes a situation which may occur upon opening the FTIV prior to a refueling process wherein, at high flow rate through the carbon canister, the valves associated with the fuel tank may cork, i.e. large amounts of air/fuel vapor egress from the fuel tank may cause a valve float to be drifted along, in an upwards direction, causing the respective valve to close and thus resulting in early refueling cutoff, i.e. before the fuel tank is full The arrangement is such that upon commencing of a refueling procedure, the central processor generates an opening signal to the integral controller of the FTIV wherein the solenoid opens for venting the fuel tank, namely for depressurizing the fuel tank, however at a controlled flow rate preventing corking of the valves.

The anti-corking system comprises a pressure sensing mechanism configured at the FTIV, wherein when pressure at the fuel tank (and respectively at the FTIV) exceeds a predetermined level a pressure parameter signal is generated and transmitted to the integral control, which in turns generates an opening signal to the solenoid, thereby discharging pressure from the fuel tank, so as to facilitate continues refueling.

According to another aspect of the present of the disclosure there is provided a fuel deterring system configured for halting a refueling process and generating an alert signal at a user interface.

The arrangement is such that at the inadvertent event of refueling using wrong type of fuel a fuel type parameter signal is transmitted to the integral controller of the FTIV, which in turn generates a closing signal to the solenoid of the FTIV, resulting in stopping the refueling process.

Any one or more of the following features, designs and configurations, can be implemented in fuel system and fuel valve, according to the presently disclosed subject matter, individually or in various combinations thereof:

The fuel level sensor can be a proximity sensor fitted at a wall of the fuel tank and configured for determining proximity of a float member displaceable within the fuel tank responsive to fuel level, and the fuel level sensor is configured for generating a respective fuel level parameter signal and transmitting said signal to the integral controller of the FTIV;

The proximity sensor, by one example, can be an ultrasonic sensor;

The proximity sensor, by one example, can be a pneumatic pressure sensor;

The float member can be displaceable within the fuel tank and can be restrained for axial displacement within the fuel tank, wherein the proximity sensor is configured for detecting distance of a target element disposed at the float member;

The fuel level sensor can be an optical sensor disposed at the fuel tank and configured for detecting the fuel surface level within the fuel tank and generating a respective fuel level parameter signal and transmitting said signal to the integral controller of the FTIV;

The roll over detection arrangement can be a roll over sensor associated with the fuel tank and thus configured for transmitting to the integral controller of the FTIV a roll over parameter signal. The roll over detection arrangement can be a roll over sensor associated with the FTIV;

The roll over detection arrangement can be integrated with the fuel level sensing system;

The roll-over detection arrangement can be a substantially uprightly extending sensor housing configured with a target element displaceable within the sensor housing responsive to gravity forces applied thereto, and a detector configured for generating a roll-over parameter signal to the integral controller of the FTIV, at the event that the target element displaces from the detector beyond a predetermined distance or time span;

The roll-over detection arrangement can be a target element articulated over a float member displaceable within a float housing, and a detector configured for detecting displacement of the float beyond a predetermined distance, whereby when the target element departs from the detector beyond a predetermined distance a roll-over parameter signal is generated and transmitted to the integral controller of the FTIV;

According to one example the target element can be a piston displaceable within the sensor housing and biased so as to assume a relative position with respect to said detector, whereupon upside down gravity forces acting on the piston result in its departing from the detector which in turn generates a roll-over parameter signal to the integral controller of the FTIV;

According to another example the detector can be disposed at a well-like bottom portion of the sensor housing, configured with a conical cross section and accommodating a target element in the form of a sphere normally configured for resting within said conical portion under gravity force. However, at the event of roll-over or extreme centrifugal force, the sphere displaces from the well portion resulting in its departing from the detector which in turn generates a roll-over parameter signal to the integral controller of the FTIV;

The pressure sensing mechanism of the anti-corking mechanism can be a biased piston displaceable within a chamber of the FTIV being in flow communication with the fuel tank, and a positioning sensor associated with said piston; whereby fluid flow through the chamber, exceeding a predetermined threshold, results in displacement of the piston from its normal position, against the biasing effect, resulting in generating a flow parameter signal which is transmitted to the integral controller of the FTIV, responsive to which an opening signal is generating to the solenoid;

The fluid flow sensing mechanism of the anti-corking mechanism can be a control volume extending in communication with a chamber of the FTIV being in flow communication with the fuel tank, said control chamber being in flow communication with the chamber through a venturi orifice, and accommodating a fluid flow sensor configured for generating a flow parameter signal responsive to fluid flow increase within the control chamber, said flow parameter signal being transmitted to the integral controller of the FTIV, responsive to which an opening signal is generating to the solenoid;

The fuel type parameter signal can be generated, for example, by an optical sensor configured for measuring fuel parameters such as color, transparency, light reflection, etc.;

The fuel type parameter signal can be generated, for example, by an acoustic (e.g. ultrasonic) sensor configured for measuring fuel parameters such as density, sound reflection, etc.;

An FTIV with the integrated solenoid and the integrated controller according to the presently disclosed subject matter provides several advantages, namely:

Reducing overall electric consumption of the fuel system;
Reducing heat emitted from the fuel system components;
Improved control of opening/closing the fluid flow passage from the fuel tank to the carbon canister.

Further to the above, and according to a first aspect of the presently disclosed subject matter, there is provided a fuel tank isolation valve (FTIV), configured for being disposed in fluid flow communication with a fuel tank and a carbon canister of a fuel system, said FTIV comprising an integrated controller and a solenoid coupled to a valve, the solenoid being movable between a normally closed position in which the valve is closed and prevents fluid communication through a first flowpath through the FTIV, and an open position in which the valve is open and allows for fluid communication through said first flowpath, said integrated controller configured for generating actuation signals to the solenoid, responsive to parameter signals received from one or more sensors associated with the fuel tank.

For example, the power consumption from a power source of the vehicle is regulated by the integrated controller.

Additionally or alternatively, for example, said parameter signals are indicative of a fuel tank situation in which closing the valve is required or desirable. For example, said solenoid is configured for moving to said closed position responsive to said integrated controller receiving said actuation signals. For example, said solenoid is configured for moving to said closed position by actuation thereof, and wherein said actuation signals cause said solenoid to become activated. Alternatively, for example, said solenoid is configured for moving to said closed position passively by ceasing actuation thereof, and wherein said actuation signals cause said solenoid to become deactivated.

Additionally or alternatively, for example, the FTIV further defines a second flow path and comprising a normally closed bypass valve, configured to override the first flow path by opening the bypass valve for enabling venting the fuel tank at predetermined threshold conditions of at least one of vacuum and overpressure. For example, said bypass valve is configured for opening said second flow path responsive to pressure changes at the fuel tank side of the FTIV exceeding predetermined pressure threshold boundaries, thereby facilitating fluid flow between the fuel tank and the carbon canister.

According to a second aspect of the presently disclosed subject matter, there is provided a sensing system for use with a fuel system, the sensing system comprising an FTIV as defined according to the aforementioned first aspect of the presently disclosed subject matter, and further comprising at least one said sensor that is associated with the fuel tank of the fuel system.

For example, at least one said sensor comprises a fuel level sensor configured for generating a said parameter signal in the form of a fuel level parameter signal corresponding to a fuel level within the tank, said fuel level sensor configured for transmitting said fuel level parameter signal to said integral controller of the FTIV, which responsive thereto provides a closing signal to the solenoid of the FTIV. For example, said fuel level parameter signal is at a maximum corresponding to a desired maximum said fuel level in the tank.

Additionally or alternatively, for example, the sensing system is further configured for transmitting said fuel level parameter signal to a central controller independent of said FTIV.

Additionally or alternatively, for example, said fuel level sensor comprises a proximity sensor configured to be fitted at a wall of the fuel tank and further configured for determining a proximity of a float member displaceable within the fuel tank responsive to fuel level, the fuel level sensor further configured for generating a respective said fuel level parameter signal and for transmitting said fuel level parameter signal at least to said integral controller of said FTIV. For example, said proximity sensor comprises an ultrasonic sensor or a pneumatic pressure sensor. Additionally or alternatively, for example, the float member comprises a target element located in axial registry with the proximity sensor, the float member being configured for being displaceable in an axial direction within the fuel tank, and wherein the proximity sensor is configured for determining a distance to said target element.

Additionally or alternatively, for example, said fuel level sensor comprises an optical sensor configured for being affixed to the fuel tank and configured for detecting the fuel surface level within the fuel tank, the fuel level sensor further configured for generating a respective said fuel level parameter signal and for transmitting said fuel level parameter signal at least to said integral controller of said FTIV.

Additionally or alternatively, for example, at least one said sensor comprises a roll-over detection sensor configured for generating a said parameter signal in the form of a roll over parameter signal corresponding to a roll over event, said roll-over detection sensor configured for transmitting said roll-over detection parameter signal to said integral controller of the FTIV, which responsive thereto provides a closing signal to the solenoid of the FTIV. For example, said roll over detection sensor comprises a substantially uprightly extending sensor housing configured with a target element displaceable within the sensor housing responsive to gravity forces applied thereto, and a detector configured for generating a said roll-over detection parameter signal to the integral controller responsive to the target element being displaced from the detector beyond a predetermined distance therefrom or for a period exceeding a predetermined time span. For example, said target element comprises a piston displaceable within the sensor housing along a displacement axis and biased so as to assume a datum position with respect to said detector when said displacement axis is aligned with the direction of gravity, and wherein when said displacement axis is angularly displaced with respect to the direction of gravity corresponding to a roll-over condition, the target element is displaced from the detector. Alternatively, for example, said sensor housing comprises a well-like bottom portion, and wherein said detector is disposed at said well-like bottom portion, the well-like bottom portion being configured with a concave-like internal surface and accommodating the target element, the target element being in the form of a sphere normally configured for assuming a datum position in said internal surface under the influence of gravity, wherein responsive to an event of roll-over or extreme centrifugal force acting on said roll over detection sensor, the target element is displaced from the datum position and thus from the detector. Alternatively, for example, said concave-like internal surface is in the form of a frusto-conical surface or in the form of part of a surface of a sphere.

Additionally or alternatively, for example, said roll over detection sensor comprises a target element articulated over a float member that is displaceable within a float housing, and a detector configured for detecting displacement of the float beyond a predetermined distance therefrom, wherein said detector is configured for generating a said roll-over detection parameter signal to the integral controller responsive to the target element being displaced from the detector beyond a predetermined distance therefrom.

Additionally or alternatively, for example, the sensing system comprises at least two said sensors including at least one said fuel level sensor and at least one said roll over detection sensor.

Additionally or alternatively, for example, at least one said sensor comprises a target pressure sensor configured for generating a said parameter signal in the form of a target pressure retention parameter signal corresponding to a target pressure check event, said target pressure sensor configured for transmitting said target pressure retention parameter signal to said integral controller of the FTIV, which responsive thereto provides a closing signal to the solenoid of the FTIV, whereupon pressure within the fuel tank is monitored during a target pressure check.

Additionally or alternatively, for example, at least one said sensor comprises a corking sensor configured for generating a said parameter signal in the form of a corking parameter signal corresponding to a corking event, said corking sensor configured for transmitting said corking parameter signal to said integral controller of the FTIV responsive to a corking event occurring with the fuel tank, wherein responsive thereto said integral controller provides a closing signal to the solenoid of the FTIV, whereupon to facilitate continued refueling. For example, said corking sensor comprises a biased target piston displaceable within a chamber of the FTIV, said chamber being configured for being in flow communication with the fuel tank when connected thereto, and further comprising a positioning sensor associated with said target piston, whereby fluid flow through the chamber, exceeding a predetermined threshold, results in a pressure increase and the displacement of the piston from its normal position, against the biasing effect, resulting in generating corking parameter signal which is transmitted to the integral controller of the FTIV, responsive to which an opening signal is generating to the solenoid. For example, said corking sensor comprises a control volume in communication with a chamber of the FTIV being in flow communication with the fuel tank in operation of the sensing system, said control chamber being in flow communication with the chamber through a venturi orifice, and accommodating a pressure sensor configured for generating a corking parameter signal in the form of a pressure parameter signal responsive to fluid flow through the chamber, exceeding a predetermined threshold, wherein said corking parameter signal is transmitted to the integral controller of the FTIV, responsive to which an opening signal is generating to the solenoid.

Additionally or alternatively, for example, at least one said sensor comprises a fuel tampering sensor configured for generating a said parameter signal in the form of a fuel tampering parameter signal corresponding to a refueling event with incorrect fuel, said fuel tampering sensor configured for transmitting said fuel tampering parameter signal to said integral controller of the FTIV responsive to an incorrect fuel being provided to the fuel tank, wherein responsive thereto said integral controller provides a closing signal to the solenoid of the FTIV, whereupon to terminate refueling. For example, said fuel tampering sensor comprises an optical sensor configured for measuring at least one fuel parameter chosen from the group including: color, transparency, light reflection qualities; wherein said fuel tampering sensor is further configured for comparing said at least one fuel parameter with a datum range of values for the corresponding fuel parameter of the correct fuel, and for providing said closing signal responsive to said at least one fuel parameter being outside said datum range of values. For example, said fuel tampering sensor comprises an acoustic sensor configured for measuring at least one fuel parameter chosen from the group including: fuel density, sound reflection qualities; wherein said fuel tampering sensor is further configured for comparing said at least one fuel parameter with a datum range of values for the corresponding fuel parameter of the correct fuel, and for providing said closing signal responsive to said at least one fuel parameter being outside said datum range of values. Additionally or alternatively, for example, said fuel tampering sensor comprises an ultrasonic sensor. Additionally or alternatively, for example, the sensing system is further configured for generating an alert signal at a user interface, responsive to said fuel tampering parameter signal being transmitted to said integral controller of the FTIV.

According to a third aspect of the presently disclosed subject matter, there is provided a fuel system comprising a fuel tank and a carbon canister, and further comprising a sensing system for use therewith, the sensing system comprising an FTIV as defined herein according to the aforementioned first aspect of the presently disclosed subject matter, and disposed in fluid flow communication with the fuel tank and the carbon canister, the sensing system being as defined herein according to the aforementioned second aspect of the presently disclosed subject matter.

For example, the fuel system further comprises a central controller configured for providing an opening signal to said integral controller to thereby cause the solenoid to move to the open position in response thereto, wherein said actuation signals are configured for overriding said opening signal and thereby cause the solenoid to move to the open position. For example, the central controller is provided by a vehicle in which the fuel system is fitted.

Additionally or alternatively, for example, said central controller is configured for providing said opening signal to said FTIV upon commencing a refueling procedure for the fuel system Additionally or alternatively, for example, said central controller is configured for performing target pressure checks within the fuel system.

Additionally or alternatively, for example, said opening signal is generated responsive to a predetermined action by a user, whereby to enable said solenoid to move to the open position thereby enabling reduction of pressure within the fuel tank prior to a fuel cap of the fuel system being removed. For example, said predetermined action includes at least one of: a suitable command switch being opened; the fuel cap door that normally covers the fuel cap being opened.

According to a fourth aspect of the presently disclosed subject matter, there is provided a vehicle comprising a fuel system, the fuel system being as defined herein according to the aforementioned third aspect of the presently disclosed subject matter

BRIEF DESCRIPTION OF THE DRAWINGS

In order to better understand the subject matter that is disclosed herein and to exemplify how it can be carried out in practice, examples will now be described, by way of non-limiting examples only, with reference to the accompanying drawings, in which:

FIGS. 2A and 2B are top perspective, front and rear views, respectively, of a fuel tank isolation valve (FTIV) according to an example of the presently disclosed subject matter.

FIG. 4A is a schematic representation of a proximity fuel level sensing system according to the disclosure; FIG. 4B is a schematic representation of an acoustic fuel level sensing system according to the presently disclosed subject matter; FIG. 4C is a schematic representation of an optic fuel level sensing system according to the presently disclosed subject matter; FIG. 4D is schematic representation of a pneumatic fuel level sensing system according to the presently disclosed subject matter;

FIG. 5A is a schematic representation of a first example of a roll over detection arrangement; FIG. 5B is a schematic representation of a second example of a roll over detection arrangement; FIG. 5C is a schematic representation of a third example of a roll over detection arrangement;

DETAILED DESCRIPTION

Figure 1A:
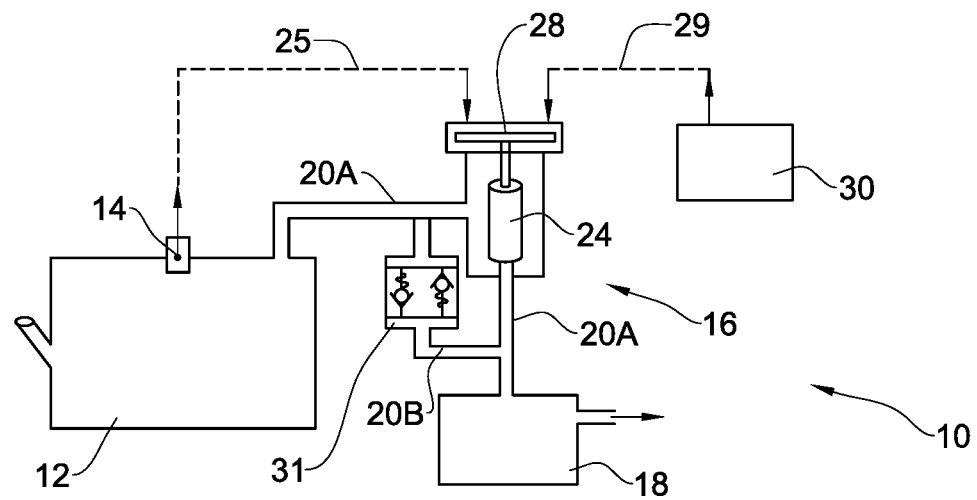
FIG. 1A is a schematic representation of a fuel system according to a first example of the presently disclosed subject matter.

Attention is first directed to FIG. 1A of the drawings schematically illustrating a fuel system according to a first example of the presently disclosed subject matter, generally designated 10, comprising a fuel tank 12 fitted with one or more (though typically several) sensors 14 associated with the fuel tank 12. A fuel tank isolation valve (FTIV) generally designated 16 is disposed between the fuel tank 12 and a carbon canister 18 selectively through a first flow path 20A and/or a second flow path 20B, as will become clearer herein.

The FTIV 16 comprises a normally closed solenoid assembly 24 selectively opening the first flow path 20A, and an integrated controller 28 receiving parameter signals (wired or wireless, as schematically represented by dashed line 25) generated by the one or more sensors 14, and in turn generates an actuation signal in the form of an opening signal to the solenoid assembly 24, so as to selectively open the first flow path 21A between the fuel tank 12 and the carbon canister 18. The integrated controller 28 can also be configured to selectively provide actuation signals to the to the solenoid assembly 24, so as to selectively close the first flow path 21A between the fuel tank 12 and the carbon canister 18. The carbon canister 18 is vented to the atmosphere.

It is noted that the one or more sensors 14 can be fitted at the fuel tank 12, and/or at fuel accessories being in flow communication with the fuel tank or at the FTIV 16, and/or at the FTIV 16.

A central processor 30 (for example, a central controller/ vehicle computer) is also in communication with the integral controller 28 of the FTIV 16 for generating an opening signal (wired or wireless, as schematically represented by dash-dotted line 29) to the integral controller 28 of the FTIV 16, which in turn generates an opening signal to the solenoid assembly 24.

Also noted is a bypass valve 31 provided at a second fuel flow path 21B is configured to override the FTIV 16 at the event of pressure exceeding predetermined vacuum or over pressure within the fuel tank 12.

Figure 1B:
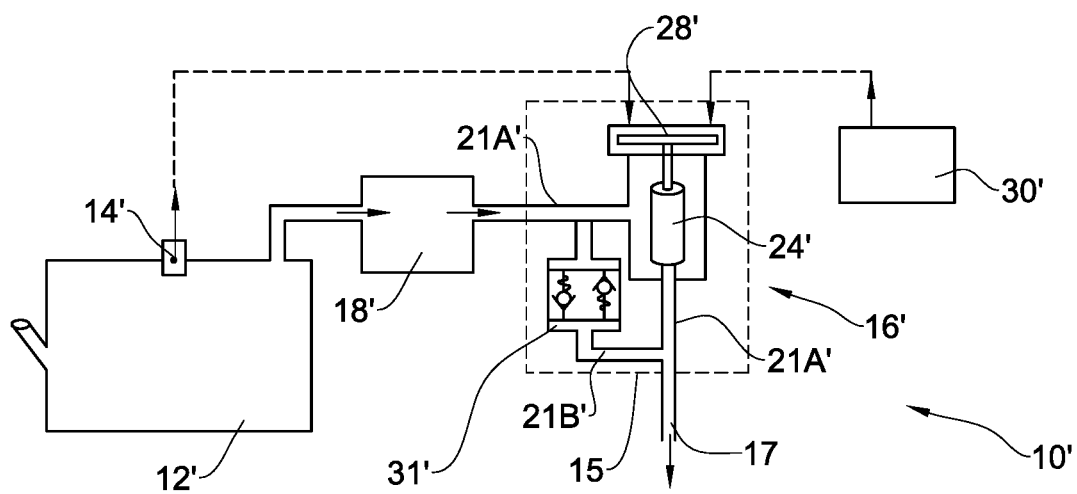
FIG. 1B is a schematic representation of a fuel system according to a second example of the presently disclosed subject matter.
Figures 2C, 2D:
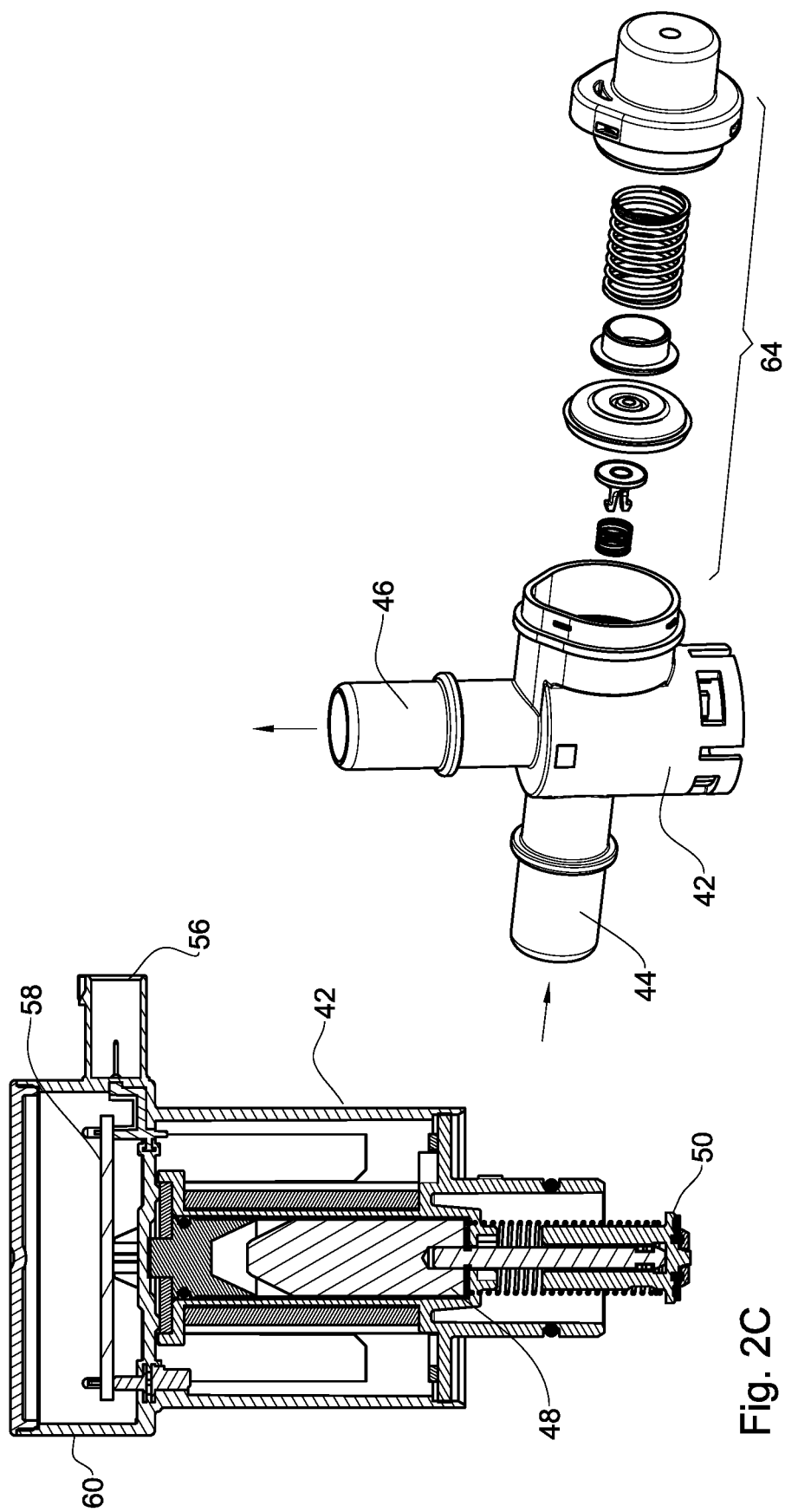
FIG. 2C is a longitudinal view of the solenoid portion and the integral controller of the FTIV according to an example of the presently disclosed subject matter.
FIG. 2D is an exploded isometric view of the bypass portion of the FTIV according to an example of the presently disclosed subject matter.
Figure 3A:
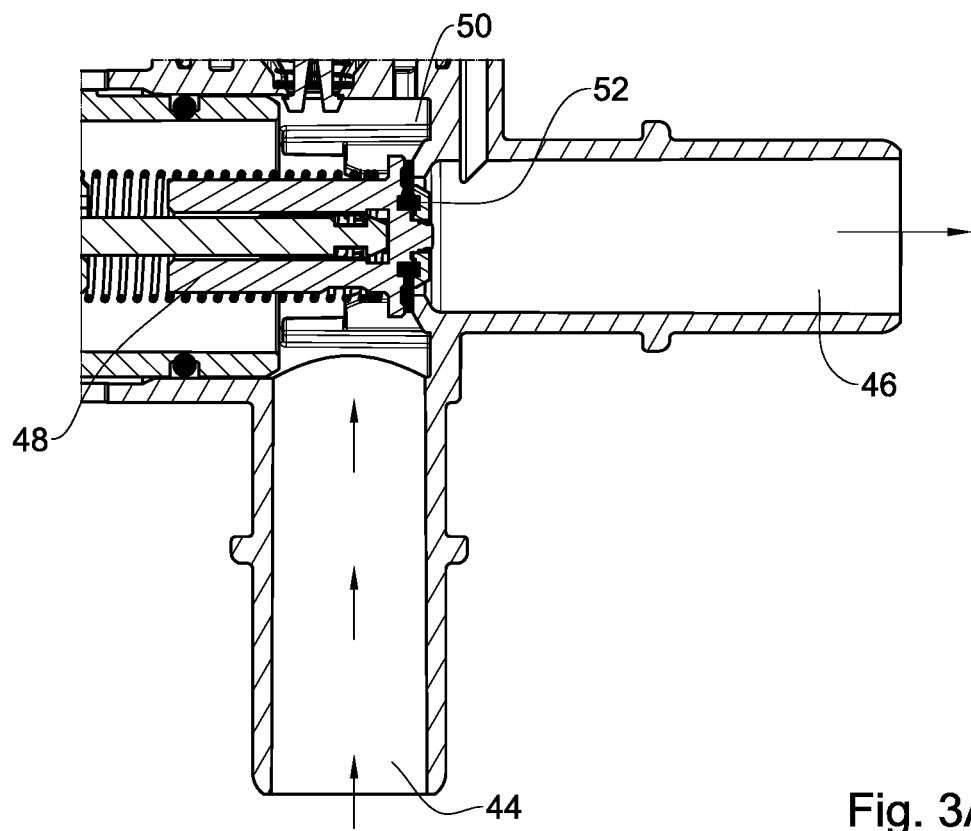
FIG. 3A illustrates a flow path of the FTIV extending between the fuel tank and the carbon canister, at the normally closed state of the solenoid.
Figure 3B:
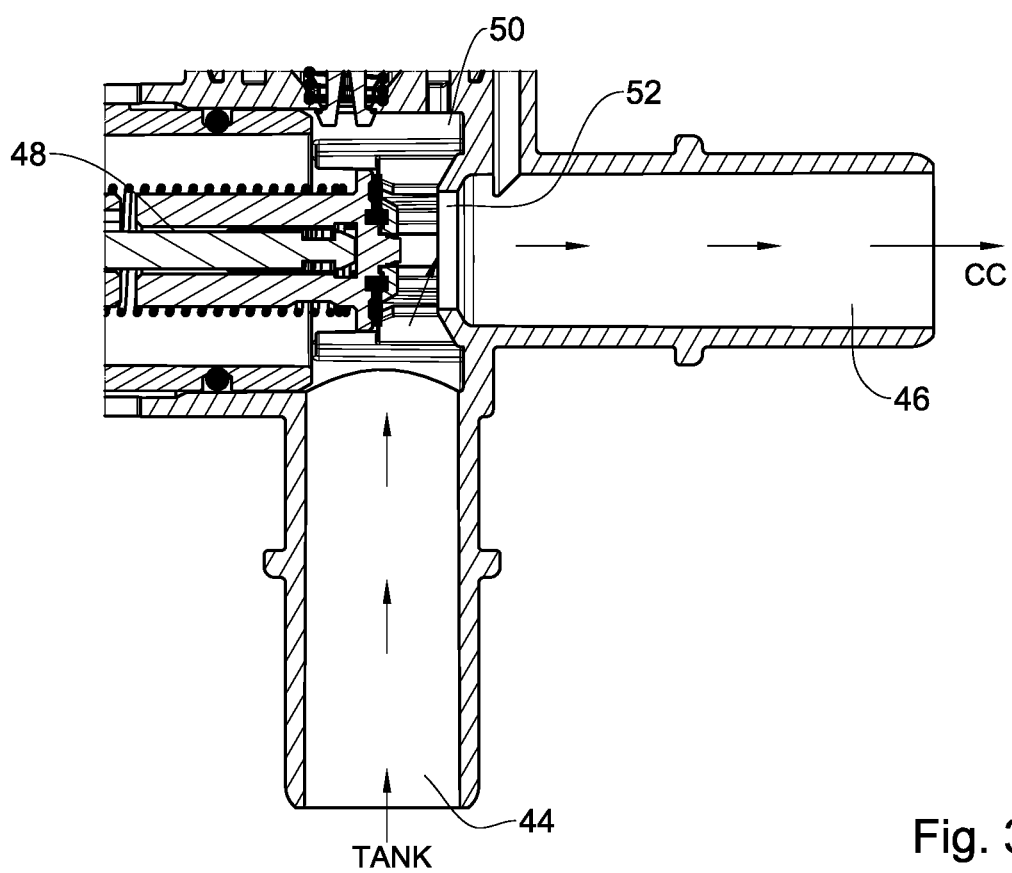
FIG. 3B illustrates the flow path of the FTIV extending between the fuel tank and the carbon canister, at the activated, open state of the solenoid.

FIG. 1B schematically illustrating a fuel system according to a second example of the presently disclosed subject matter, generally designated 12' wherein like elements as in FIG. 1A are designated with like reference numbers with a "'" indication. In this example the carbon canister 18' is disposed between the fuel tank 12' and the FTIV assembly 15, and wherein treated fuel vapor can flow through outlet 17 to the atmosphere or to a further vapor treating device (not shown). The arrangement is such that fluid flow through the carbon canister 18' along the first flow path 21A' is facilitated only when the normally closed FTIV 16' is open. A second flow path 21B' is provided with bypass valve 31'.

Thus, in both examples of FIG. 1A and FIG. 1B, the FTIV 16 or 16' is configured for being disposed in fluid flow communication with the fuel tank 12 or 12' and the carbon canister 18 or 18' of the respective fuel system, in which the FTIV 16 or 16' comprises integrated controller 28 or 28', and solenoid assembly 24 (comprising a solenoid coupled to a valve), the solenoid being movable between a normally closed position in which the valve is closed and prevents fluid communication through the first flowpath 20A through the FTIV, and an open position in which the valve is open and allows for fluid communication through the first flowpath 20A. Furthermore, the integrated controller 28 or 28' is configured for generating actuation signals to the solenoid, responsive to parameter signals received from one or more sensors 14 associated with the fuel tank.

With further reference now directed to FIGS. 2A to 2D there is illustrated a particular example of an FTIV according to the disclosure, generally designated 40. The FTIV 40 comprises a housing 42 comprising an inlet port 44 for coupling to fuel tank (12 in FIG. 1) through flow path line 20A, and an outlet port 46 for coupling to a carbon canister (18 in FIG. 1) through flow path 20B. Bracket 43 is configured at the housing for mounting same at a suitable position.

A normally closed solenoid assembly 48 (seen in cross section in FIG. 2C, and also in FIGS. 7A and 7B) is integrated with the housing 42 and comprises a sealing plunger 50 disposed at a flow path between the inlet port 44 and the outlet port 46, said sealing plunger 50 being normally biased into sealing said path by sealing engagement of a valve seat 52 (FIGS. 3A, 3B, 7A and 7B). The solenoid assembly 48 is controlled by a controller 58, integrated with the FTIV at a controller chamber 60 disposed at a top portion of the housing 42. A data port 56 is configured for coupling thereto of wired or wireless communication arrangement for transmitting parameter signals to the controller.

The FTIV 40 is further configured with a normally closed bypass valve assembly generally designated 64 (seen at exploded view of FIG. 2D), configured to override the solenoid assembly 48 for venting the fuel tank 12 at predetermined threshold conditions of vacuum and overpressure. The bypass valve assembly 64 is disposed between the flow path extending between the inlet port 44 and the outlet port 46, whereby at the event of pressure increase at the fuel tank side of the FTIV beyond a predetermined threshold, or at the event of pressure decreases at the fuel tank side of the FTIV below a predetermined threshold, then vacuum bypass valve assembly 64 will open so as facilitate fluid flow between the fuel tank 10 and the carbon canister 18.

According to at least some aspects of the presently disclosed subject matter, the fuel system 10 can be provided with a sensing system for use therewith, in which the sensing system comprises at least one sensor 14.

At least one such sensor 14 comprises a fuel level sensor configured for generating a parameter signal in the form of a fuel level parameter signal corresponding to a fuel level within the tank, the fuel level sensor being configured for transmitting the fuel level parameter signal to the integral controller 18 of the FTIV 16, which responsive thereto provides a closing signal to the solenoid assembly 24 of the FTIV 16.

Turning now to FIGS. 4A to 4D there are illustrated a number of different examples of the aforementioned fuel level sensor, also referred to interchangeably herein as fuel level sensing systems. In FIG. 4A the fuel tank 12 includes a fuel level sensor comprising a proximity detector 72, target element 74, float member 76 and float housing 78. The fuel tank 12 is fitted at a top wall 70 thereof with proximity detector 72 which is configured for cooperation with target element 74 fitted over float member displaceable within float housing 78, whereby displacement of the float member 76 is restricted to substantially axial displacement within said float housing. For example, the proximity detector 72 can comprise an ultrasonic sensor or a pneumatic sensor.

The arrangement is such that during refueling, as fuel level rises within the fuel tank 12, and reaches a cutoff level, i.e. corresponding to the 'full tank' condition, the target element 74 nears the proximity detector 72 as a result of which a full level parameter signal is generated and transmitted directly to the integral controller 58 of the FTIV 40. It is appreciated that the fuel level parameter signal can be transmitted to the controller 58 wirelessly (e.g. RF transmission, with an encoder articulated to the controller) or by suitable wiring directly coupled to the controller 58, through data port 56. This arrangement is common to the following features as well, mutatis mutandis.

Once the full level parameter signal is received at the controller 58, the latter generates a closing signal to the solenoid assembly 48, whereby the flow path between the fuel tank and the carbon canister closes. Likewise, a 'full tank' signal can be generated and transmitted also to the central computer 30, e.g. for providing a corresponding indication at the dashboard.

The arrangement disclosed in FIG. 4B shows another example of the aforementioned fuel level sensor, comprising an acoustic sensor 82 fitted at a top wall 84 of the fuel tank. The acoustic sensor 82 comprises one or more ultrasonic emitting source 86 and respective acoustic detectors 88. During refueling, as fuel level reaches a predetermined 'full tank' level the detector 88 receives an acoustic signal reflected from the fuel surface, indicative of said level, whereby a corresponding full level parameter signal is generated and transmitted directly to the integral controller 58 of the FTIV 40.

Once the full level parameter signal is received at the controller 58, the latter generates a closing signal to the solenoid assembly 48, whereby the flow path between the fuel tank and the carbon canister is temporarily opened. Likewise, a 'full tank' signal can be generated and transmitted also to the central computer 30, e.g. for providing a corresponding indication at the dashboard.

In FIG. 4C there is schematically illustrated another example of the aforementioned fuel level sensor, comprising an optical sensor 92 fitted at a top wall 94 of the fuel tank. The optical sensor 92 comprises one or more optical emitting source 96 and respective optical detectors 98. During refueling, as fuel level reaches a predetermined 'full tank' level the detector 98 receives an optical signal reflected from the fuel surface, indicative of said level, whereby a corresponding full level parameter signal is generated and transmitted directly to the integral controller 58 of the FTIV 40.

Once the full level parameter signal is received at the controller 58, the latter generates a closing signal to the solenoid assembly 48, whereby the flow path between the fuel tank and the carbon canister is temporarily opened. Likewise, a 'full tank' signal can be generated and transmitted also to the central computer 30, e.g. for providing a corresponding indication at the dashboard.

It is appreciated that the acoustic and/or optic sensors, and in fact other sensors used in conjunction with an FTIV according to the disclosure, can be configured at one or more locations of the fuel tank.

The illustration of FIG. 4D shows another example of the aforementioned fuel level sensor, in the form of a pressure triggered full tank sensor comprising a confined space 100 extending at a top wall portion 102 of the fuel tank, said space 100 being substantially sealed however with an opening at a bottom portion. A pressure sensor 104 is disposed within said confined space 100.

During refueling, as fuel level in the tank reaches a predetermined 'full tank' level, the rising fuel causes pressure increase within the confined space 100, whereby the pressure detector 104 generates a full level parameter signal indicative of said level, whereby the signal is transmitted directly to the integral controller 58 of the FTIV 40.

Once the full level parameter signal is received at the controller 58, the latter generates a closing signal to the solenoid assembly 48, whereby the flow path between the fuel tank and the carbon canister is temporarily opened. Likewise, a 'full tank' signal can be generated and transmitted also to the central computer 30, e.g. for providing a corresponding indication at the dashboard. Optionally, at least one such sensor 14 comprises a fuel tampering sensor configured for generating a parameter signal in the form of a fuel tampering parameter signal corresponding to a refueling event with incorrect fuel, the fuel tampering sensor being configured for transmitting the fuel tampering parameter signal to the integral controller 28 of the FTIV, which responsive thereto provides a closing signal to the solenoid of the FTIV.

It is further noted that the configurations disclosed hereinabove with reference to FIGS. 4B and 4C can be used, additionally or alternatively, for detecting and confirming that the correct fuel type is used. For example, the fuel tampering sensor comprises an optical sensor configured for measuring at least one fuel parameter chosen from the group including: color, transparency, light reflection qualities; wherein the fuel tampering sensor is further configured for comparing the fuel parameter with a datum range of values for the corresponding fuel parameter of the correct fuel, and for providing the closing signal responsive to the fuel parameter being outside the datum range of values. In another example, the fuel tampering sensor comprises an acoustic sensor configured for measuring at least one fuel parameter chosen from the group including: fuel density, sound reflection qualities; wherein the fuel tampering sensor is further configured for comparing the fuel parameter with a datum range of values for the corresponding fuel parameter of the correct fuel, and for providing the closing signal responsive to the measured fuel parameter being outside said datum range of values. Such use can alert the driver if the tank is being filled with the wrong type of fuel. Optionally, at least one such sensor 14 comprises a roll-over detection sensor (also referred to herein interchangeably as a roll-over detection system) configured for generating a parameter signal in the form of a roll over parameter signal corresponding to a roll over event, the roll-over detection sensor being configured for transmitting the roll-over detection parameter signal to the integral controller 28 of the FTIV, which responsive thereto provides a closing signal to the solenoid of the FTIV.

With further attention now being directed to FIGS. 5A to 5C of the drawings, there are disclosed several examples of roll-over detection sensors suitable for used in conjunction with an FTIV according to aspects of the presently disclosed subject matter.

The first roll-over detection system illustrated in FIG. 5A comprises an upright extending cylindrical housing 110 secured to a fixed platform (e.g. at the area of controller chamber 60 of the FTIV 16), said housing 110 is configured at a bottom portion thereof with a stationary detector 112 and a target element in the form of a target piston 114 slidingly displaceable within the housing 110 responsive to gravity forces applied thereto and being biased by a coiled spring 116 so as to retain a distance from the detector 112. As long as the target piston 114 is within a predetermined distance threshold from the detector 112 no signal is generated.

Furthermore, the target piston 114 is displaceable within the sensor housing 110 along a displacement axis 113 and biased so as to assume a datum position with respect to detector 112 when the displacement axis 113 is aligned with the direction of gravity, and wherein when the displacement axis 113 is angularly displaced with respect to the direction of gravity corresponding to a roll-over condition, the target element 114 is displaced from the detector 112.

Thus, at a roll over event, in which the vehicle rolls over at or exceeding a critical angular tilting of the vehicle, the displacement axis 113 becomes correspondingly tilted to the vertical (i.e., with respect to the direction of gravity), and gravity forces acting on the target piston 114 cause it to displace within the housing 110 in direction away from the detector 112, resulting in the detector 112 generating a roll-over parameter signal which is transmitted directly to the integral controller 58 of the FTIV 40. Such a critical angular tilting can be considered as the maximum critical angular tilting in which the vehicle can still return to the stable non-rolled position, typically horizontal orientation.

Once the rollover parameter signal is received at the controller 58, the latter generates a signal to the solenoid assembly 48, whereby the flow path between the fuel tank and the carbon canister is temporarily opened. Likewise, a 'full tank' signal can be generated and transmitted also to the central computer 30, e.g. for providing a corresponding indication at the dashboard.

The arrangement of FIG. 5B discloses a modification of a roll-over detection system illustrated comprising an upright extending cylindrical housing 120 secured to a fixed platform, said housing 120 is configured at a bottom portion thereof with a 1 well-like portion 122 and a stationary detector 124 disposed there below. The well-like bottom portion is configured with a concave-like internal surface and accommodating the target element in the form of spherical target element 126. The concave-like internal surface is in the form of a frusto-conical surface in this example, but can also be, for example, in the form of part of a surface of a sphere.

The spherical target element 126 is normally at rest at the bottom of the well-like portion 122, at close proximity to the detector 124. As long as the spherical target element 126 is disposed within the well-like portion no signal is generated.

However, at the event of roll-over event or other critical angular tilting of the vehicle, gravity forces acting on the spherical target element 126 cause it to displace within the housing 120 in direction away from the detector 124, resulting in the detector 124 generating a roll-over parameter signal which is transmitted directly to the integral controller 58 of the FTIV 40.

Once the roll-over parameter signal is received at the controller 58, the latter generates a signal to the solenoid assembly 48, whereby the flow path between the fuel tank and the carbon canister is temporarily opened. Likewise, a 'full tank' signal can be generated and transmitted also to the central computer 30, e.g. for providing a corresponding indication at the dashboard.

In FIG. 5C there is illustrated yet an example of a roll-over detection system wherein a top wall portion 130 of the fuel tank is fitted with detector unit 132. Below said detector 132, within the fuel tank, there is configured a tubular float-bearing housing 134 accommodating a float member 136 axially displaceable within the housing 134. A light biasing spring 138 is disposed between a bottom wall of the housing and the float, with a target element 140 disposed at a top of the float 136.

The arrangement is such that as long as the vehicle and the fuel tank with the housing 134 are at a substantially upright position, the float 136 and the target element 140 fixed thereto are at a predetermined distance from the detector 132. However, at the event of rollover or critical angular tilting of the vehicle, gravity forces acting on the float member 136, together with the spring 136, cause the float member 136 to displace axially within the housing 134 in direction towards the detector 132, resulting in the later generating a rollover parameter signal which is transmitted directly to the integral controller 58 of the FTIV 40.

Once the rollover parameter signal is received at the controller 58, the latter generates a signal to the solenoid assembly 48, whereby the flow path between the fuel tank and the carbon canister is temporarily opened. Likewise, a 'full tank' signal can be generated and transmitted also to the central computer 30, e.g. for providing a corresponding indication at the dashboard Optionally, at least one such sensor 14 comprises a target pressure sensor configured for generating a parameter signal in the form of a target pressure retention parameter signal corresponding to a target pressure check event, the target pressure sensor being configured for transmitting the target pressure retention parameter signal to the integral controller of the FTIV, which responsive thereto provides a closing signal to the solenoid of the FTIV, whereupon pressure within the fuel tank is monitored during a target pressure check.

Figure 6A:
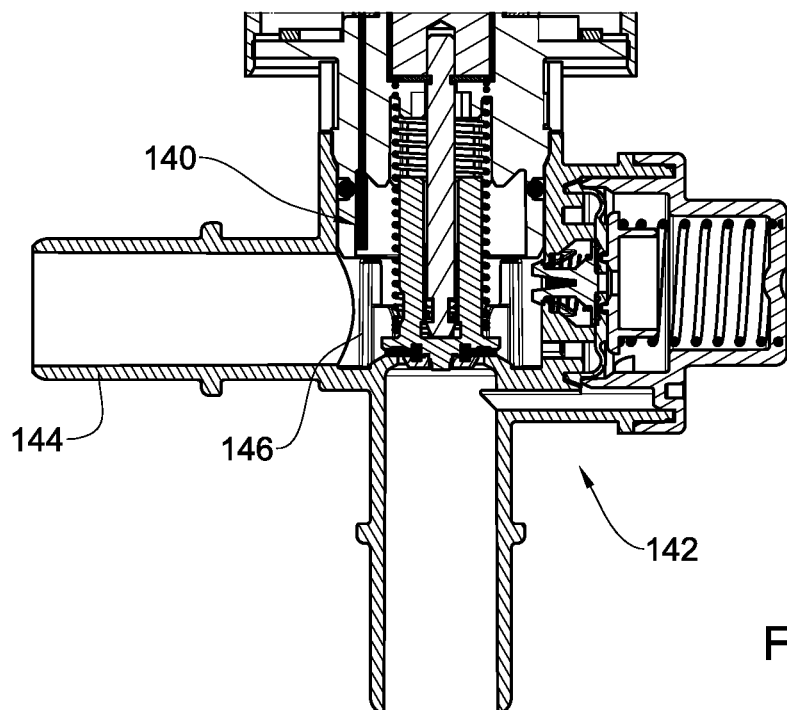
FIG. 6A is a schematic representation of a target pressure system according to a first example of the presently disclosed subject matter.
Figure 6B:
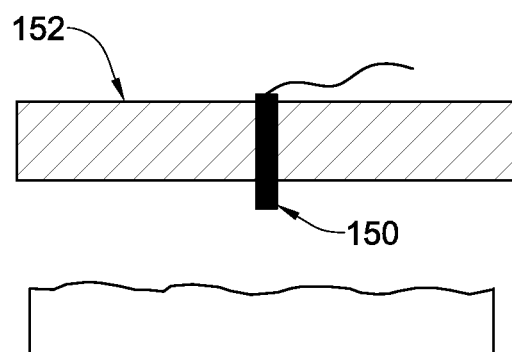
FIG. 6B is a longitudinal section through an FTIV configured with target pressure sensor according to a second example of the presently disclosed subject matter.

In FIGS. 6A and 6B there are illustrated examples of such target pressure sensor arrangements, configured for determining correct pressure threshold within the fuel tank while the central processor of the vehicle performs some tests, i.e. so as to ascertain no leaks from the fuel tank when under pressure.

In FIG. 6A a target pressure sensor 140 is integrated within the FTIV generally designated 142, which is similar to the FTIVs disclosed herein before. However, it is appreciated that the target pressure sensor can be configured at other locations too, e.g. at a location along the inlet tube segment 144, at an inlet chamber 146, etc. Likewise, a target pressure sensor 150 can be configured at a wall portion 152 of the fuel tank (FIG. 6B).

The arrangement is such that an activation signal is transmitted from the central controller/computer 30 to the integral controller 28, whereby the normally closed solenoid now assumes an open condition. The controller will then close so that the target pressure within the fuel tank is reached, and the pressure sensor facilitates a target pressure checkup, namely to confirm that said target pressure is maintained in the fuel tank during the checkup.

It is however appreciated that the FTIV does not regulate the pressure within the fuel tank but rather serves to establish a predetermined pressure threshold within the fuel tank so that target pressure can be measured along a period of time, in order to detect pressure drop owing to leaks in the fuel system.

Thus, the respective target pressure sensor (e.g. 140; 150) measures the pressure over time of the checkup and transmits a target pressure parameter signal which is transmitted directly to the integral controller 58 of the FTIV 40, for the latter to close in order to maintain the target pressure required for the computer to perform the pressure checkup.

Optionally, at least one such sensor 14 comprises a corking sensor configured for generating a parameter signal in the form of a corking parameter signal corresponding to a corking event, the corking sensor configured for transmitting the corking parameter signal to the integral controller of the FTIV responsive to a corking event occurring with the fuel tank, wherein responsive thereto the integral controller provides a closing signal to the solenoid of the FTIV, whereupon to facilitate continued refueling.

Thus, yet another optional feature of an FTIV according to the presently disclosed subject matter is such a corking sensor, also referred to herein interchangeably as an anti-corking system or as an anti-corking sensing mechanism.

"Corking" herein refers to a situation which can occur during fast refueling wherein a large amount of air/fuel vapor egress from the fuel tank causing a valve float to be drifted along, in an upwards direction, causing the valve to close and thus resulting in early refueling cutoff, i.e. before the fuel tank is full.

Figure 7A:
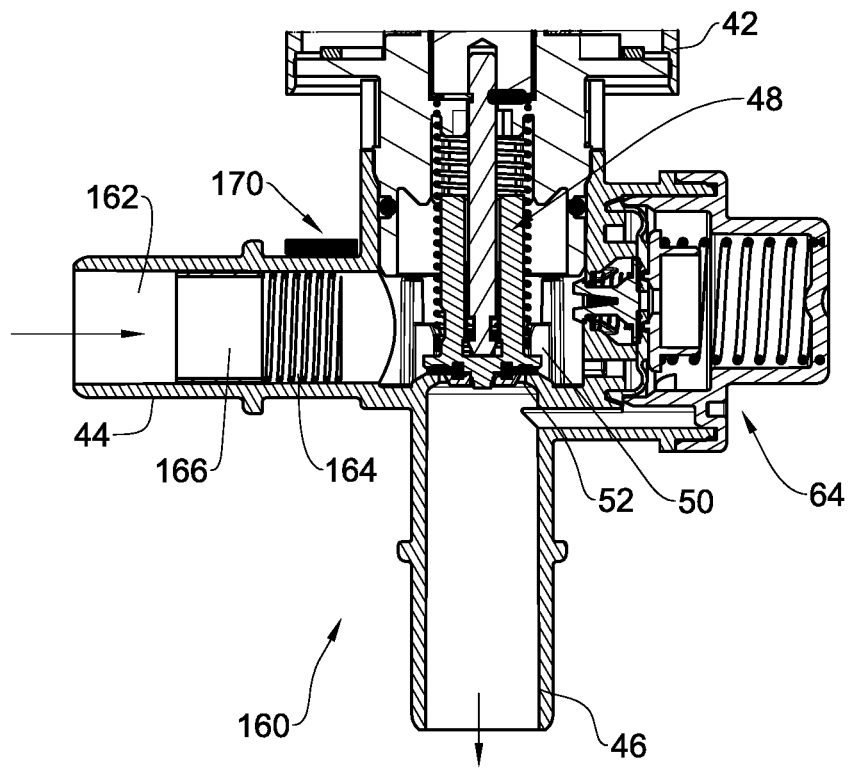
FIG. 7A is a longitudinal section through an FTIV configured with a first example of an anti-corking system according to the disclosure.

An anti-corking system according to a first example is illustrated in FIG. 7A and comprises an FTIV generally designated 160, similar to the previous examples, and is further configured with a target piston 162 displaceable within a chamber defined by an inlet port 44 of the FTIV 160, and being in flow communication with the fuel tank (not shown). The target piston 162 is biased by coiled spring 164 in direction of arrow 166. A position detector (sensor) 170 is fixed at a location of the inlet port.

The arrangement is such that upon pressure increase within the chamber, namely inlet port 44) the target piston 162 displaces from its normal position, against the biasing effect of spring 164 (i.e. in a direction opposed to that of arrow 166), resulting in generating a pressure parameter signal which is transmitted to the integral controller 42 of the FTIV 160, responsive to which an opening signal is generating to the solenoid 48, resulting in pressure decrease within the fuel tank, as a result of which refueling is continuous.

The anti-corking system thus ensures that at the event of pressure increase at the fuel tank (and respectively at the FTIV) beyond a predetermined level, a corking parameter signal, in the form of a pressure parameter signal, is generated and transmitted to the integral control, which in turn generates an opening signal to the solenoid, thereby discharging pressure from the fuel tank, so as to facilitate continues refueling.

Figure 7B:
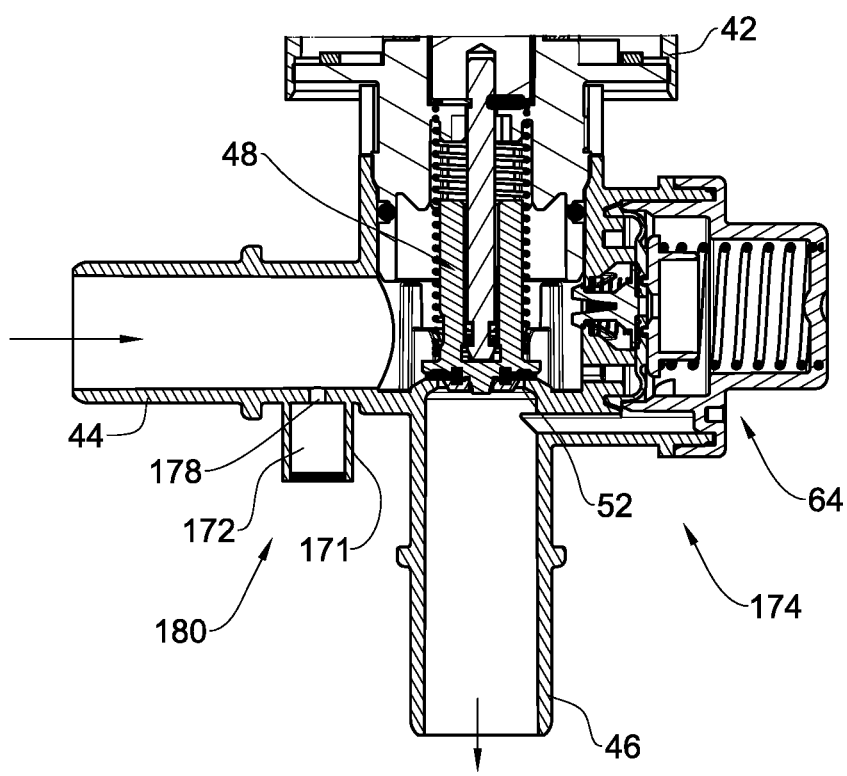
FIG. 7B is a longitudinal section through an FTIV configured with a second example of an anti-corking system according to the presently disclosed subject matter.

The example of FIG. 7B discloses a different anti-corking sensing mechanism wherein a control chamber 171 projects from the inlet port 44 and defines a control volume 172 in flow communication with the inlet chamber defined by inlet port 44 of the FTIV 174, said inlet port 44 being in flow communication with the fuel tank (not shown) when connected thereto. The control volume 172 is in flow communication with the inlet chamber through a venturi orifice 178, said control chamber 171 being further fitted with a pressure sensor 180 configured for generating a corking parameter signal, in the form of a pressure parameter signal responsive to pressure decrease within the control chamber 171 which can occur upon fast refueling and respective fast fuel vapor flow through the inlet port 44. The pressure parameter signal is in turn transmitted to the integral controller 42 of the FTIV 174, responsive to which a closing signal is generated to the solenoid 48, resulting in flow decrease within the fuel tank as disclosed herein above.

Figure 8A:
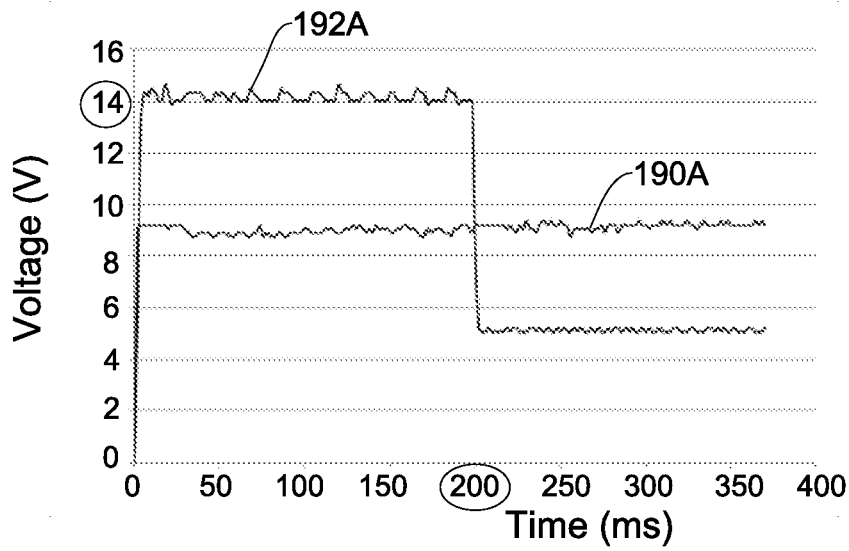
FIGS. 8A to 8C are graphs illustrating electric power consumption [Volts] Vs. time [ms.] of a an FTIV according to the presently disclosed subject matter, at three electric inputs, respectively.
Figure 8B:
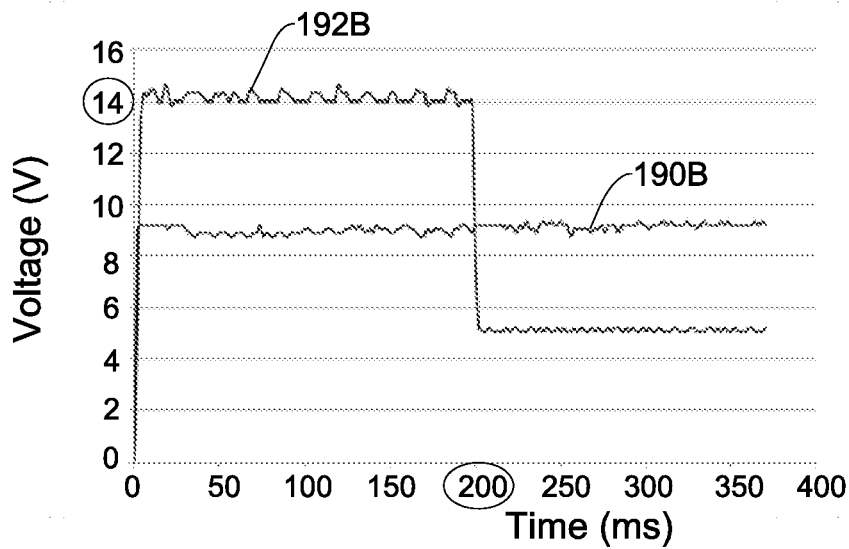
Figure 8C:
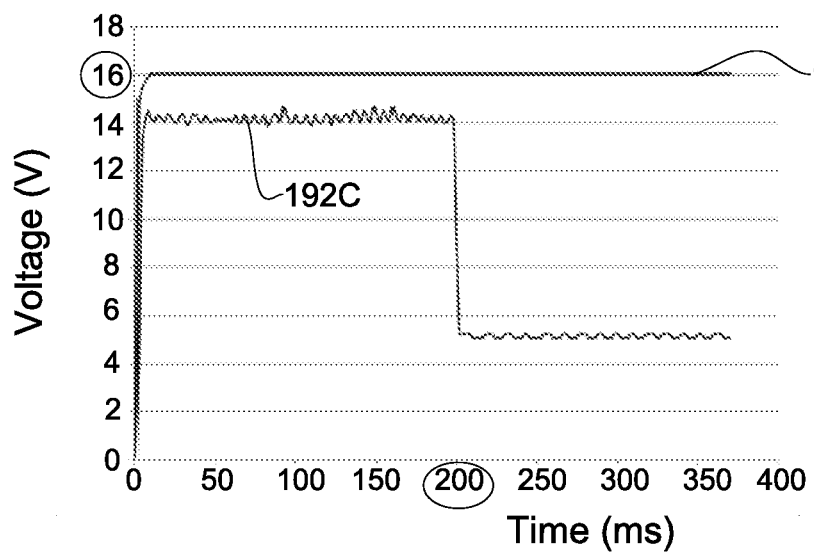

Turning now to FIGS. 8A to 8C there are illustrated three graphs representing the electric performance of a integral controller of an FTIV according to the presently disclosed subject matter, representing particular performance examples at three typical power inputs [volts] as provided by the vehicle's battery, wherein FIG. 8A represents an input of 9 volts, FIG. 8B represents an input of 12 volts, and FIG. 8C represents an input of 16 volts, as represented by lines 190A, 190B and 190C, respectively. However, as seen in the three graphs, the actual output power used for opening the solenoid is substantially constant at 14 volts (lines 190A, 190B and 192C, respectively), and the duration at which this power is consumed is only about 200 ms.

This arrangement can provide effective opening of the FTIV in spite of high pressure residing within the fuel tank (this is referred to as depressurizing). However, once the solenoid opens, the pressure within the FTIV equalizes and then, after approximately 200 milliseconds the electric power output can drop to about 5 volts for as long as required that the FTIV remains open. Since the retaining the solenoid open does not require overcoming any significant force (as opposed to the initial opening i.e. when the tank is pressurized) thus a power output of approx. 5 volts will suffice.

The above disclosed arrangement has the advantage of lower power consumption and reduced heat generation.

The invention claimed is:

1. A fuel tank isolation valve (FTIV) configured for being disposed in fluid flow communication with a fuel tank and a carbon canister of a fuel system, said FTIV comprising:
   an integrated controller; and
   a solenoid coupled to a valve;
   wherein the solenoid is movable between a normally closed position in which the valve is closed and prevents fluid communication through a first flowpath through the FTIV, and an open position in which the valve is open and allows for fluid communication through said first flowpath;
   wherein said integrated controller is configured for generating actuation signals to the solenoid responsive to parameter signals received from one or more sensors associated with the fuel tank.

2. The FTIV according to claim 1, including at least one of the following:
   wherein power consumption from a power source of the vehicle is regulated by the integrated controller;
   wherein said parameter signals are indicative of a fuel tank situation in which closing the valve is required or desirable;
   wherein said parameter signals are indicative of a fuel tank situation in which closing the valve is required or desirable, and, wherein said solenoid is configured for moving to said closed position responsive to said integrated controller receiving said actuation signals;
   wherein said parameter signals are indicative of a fuel tank situation in which closing the valve is required or desirable, and, wherein said solenoid is configured for moving to said closed position responsive to said integrated controller receiving said actuation signals, and wherein said solenoid is configured for moving to said closed position by actuation thereof, and wherein said actuation signals cause said solenoid to become activated; or
   wherein said parameter signals are indicative of a fuel tank situation in which closing the valve is required or desirable, and, wherein said solenoid is configured for moving to said closed position responsive to said integrated controller receiving said actuation signals, and, wherein said solenoid is configured for moving to said closed position passively by ceasing actuation thereof, and wherein said actuation signals cause said solenoid to become deactivated.

3. The FTIV according to claim 1, further defining a second flow path and comprising a normally closed bypass valve, configured to override the first flow path by opening the normally closed bypass valve for enabling venting the fuel tank at predetermined threshold conditions of at least one of vacuum and overpressure.

4. The FTIV according to claim 3, wherein said normally closed bypass valve is configured for opening said second flow path responsive to pressure changes at the fuel tank side of the FTIV exceeding predetermined pressure threshold boundaries, thereby facilitating fluid flow between the fuel tank and the carbon canister.

5. A sensing system for use with a fuel system, the sensing system comprising:
   the FTIV of claim 1; and
   at least one of said one or more sensors that is associated with the fuel tank of the fuel system.

6. The sensing system according to claim 5, wherein at least one of said one or more sensors comprises a fuel level sensor configured for generating said parameter signal in the form of a fuel level parameter signal corresponding to a fuel level within the tank, said fuel level sensor configured for transmitting said fuel level parameter signal to said integral controller of the FTIV, which responsive thereto provides a closing signal to the solenoid of the FTIV.

7. The sensing system according to claim 6, including at least one of the following:
   wherein said fuel level parameter signal is at a maximum corresponding to a desired maximum said fuel level in the tank; or
   wherein the sensing system is further configured for transmitting said fuel level parameter signal to a central controller independent of said FTIV.

8. The sensing system according to claim 6, wherein said fuel level sensor comprises a proximity sensor configured to be fitted at a wall of the fuel tank and further configured for determining a proximity of a float member displaceable within the fuel tank responsive to fuel level, the fuel level sensor further configured for generating a respective said fuel level parameter signal and for transmitting said fuel level parameter signal at least to said integral controller of said FTIV.

9. The sensing system according to claim 8, including at least one of the following:
wherein said proximity sensor comprises one of an ultrasonic sensor or a pneumatic pressure sensor; or
wherein the float member comprises a target element located in axial registry with the proximity sensor, the float member being configured for being displaceable in an axial direction within the fuel tank, and wherein the proximity sensor is configured for determining a distance to said target element.

10. The sensing system according to claim 6, wherein said fuel level sensor comprises an optical sensor configured for being affixed to the fuel tank and configured for detecting the fuel surface level within the fuel tank, the fuel level sensor further configured for generating a respective said fuel level parameter signal and for transmitting said fuel level parameter signal at least to said integral controller of said FTIV.

11. The sensing system according to claim 5, including at least one of the following:
wherein at least one of said one or more sensors comprises a roll-over detection sensor configured for generating a said parameter signal in the form of a roll over parameter signal corresponding to a roll over event, said roll-over detection sensor configured for transmitting said roll-over detection parameter signal to said integral controller of the FTIV, which responsive thereto provides a closing signal to the solenoid of the FTIV;
wherein said roll over detection sensor comprises a substantially uprightly extending sensor housing configured with a target element displaceable within the sensor housing responsive to gravity forces applied thereto, and a detector configured for generating a said roll-over detection parameter signal to the integral controller responsive to the target element being displaced from the detector beyond a predetermined distance therefrom or for a period exceeding a predetermined time span;
wherein said roll over detection sensor comprises a substantially uprightly extending sensor housing configured with a target element displaceable within the sensor housing responsive to gravity forces applied thereto, and a detector configured for generating a said roll-over detection parameter signal to the integral controller responsive to the target element being displaced from the detector beyond a predetermined distance therefrom or for a period exceeding a predetermined time span, and, wherein said target element comprises a piston displaceable within the sensor housing along a displacement axis and biased so as to assume a datum position with respect to said detector when said displacement axis is aligned with the direction of gravity, and wherein when said displacement axis is angularly displaced with respect to the direction of gravity corresponding to a roll-over condition, the target element is displaced from the detector;
wherein said roll over detection sensor comprises a substantially uprightly extending sensor housing configured with a target element displaceable within the sensor housing responsive to gravity forces applied thereto, and a detector configured for generating a said roll-over detection parameter signal to the integral controller responsive to the target element being displaced from the detector beyond a predetermined distance therefrom or for a period exceeding a predetermined time span, and, wherein said sensor housing comprises a well-like bottom portion, and wherein said detector is disposed at said well-like bottom portion, the well-like bottom portion being configured with a concave-like internal surface and accommodating the target element, the target element being in the form of a sphere normally configured for assuming a datum position in said internal surface under the influence of gravity, wherein responsive to an event of roll-over or extreme centrifugal force acting on said roll over detection sensor, the target element is displaced from the datum position and thus from the detector;
wherein said roll over detection sensor comprises a substantially uprightly extending sensor housing configured with a target element displaceable within the sensor housing responsive to gravity forces applied thereto, and a detector configured for generating a said roll-over detection parameter signal to the integral controller responsive to the target element being displaced from the detector beyond a predetermined distance therefrom or for a period exceeding a predetermined time span, and, wherein said concave-like internal surface is in the form of a frusto-conical surface or in the form of part of a surface of a sphere; or
wherein said roll over detection sensor comprises a target element articulated over a float member that is displaceable within a float housing, and a detector configured for detecting displacement of the float beyond a predetermined distance therefrom, wherein said detector is configured for generating a said roll-over detection parameter signal to the integral controller responsive to the target element being displaced from the detector beyond a predetermined distance therefrom.

12. The sensing system according to claim 5, further comprising at least two of said one or more sensors including said at least one fuel level sensor of claim 6, and at least one said roll over detection sensor of claim 11.

13. The sensing system according to claim 5, wherein at least one of said one or more sensors comprises a target pressure sensor configured for generating said parameter signal in the form of a target pressure retention parameter signal corresponding to a target pressure check event, said target pressure sensor configured for transmitting said target pressure retention parameter signal to said integral controller of the FTIV, which responsive thereto provides a closing signal to the solenoid of the FTIV, whereupon pressure within the fuel tank is monitored during a target pressure check.

14. The sensing system according to claim 5, wherein at least one of said one or more sensors comprises a corking sensor configured for generating a said parameter signal in the form of a corking parameter signal corresponding to a corking event, said corking sensor configured for transmitting said corking parameter signal to said integral controller of the FTIV responsive to a corking event occurring with the fuel tank, wherein responsive thereto said integral controller provides a closing signal to the solenoid of the FTIV, whereupon to facilitate continued refueling.

15. The sensing system according to claim 14, including at least one of the following:
wherein said corking sensor comprises a biased target piston displaceable within a chamber of the FTIV, said chamber being configured for being in flow communication with the fuel tank when connected thereto, and further comprising a positioning sensor associated with said target piston, whereby fluid flow through the chamber, exceeding a predetermined threshold, results in a pressure increase and the displacement of the piston from its normal position, against the biasing effect, resulting in generating corking parameter signal which is transmitted to the integral controller of the FTIV, responsive to which an opening signal is generating to the solenoid; or wherein said corking sensor comprises a control volume in communication with a chamber of the FTIV being in flow communication with the fuel tank in operation of the sensing system, said control chamber being in flow communication with the chamber through a venturi orifice, and accommodating a pressure sensor configured for generating a corking parameter signal in the form of a pressure parameter signal responsive to fluid flow through the chamber, exceeding a predetermined threshold, wherein said corking parameter signal is transmitted to the integral controller of the FTIV, responsive to which an opening signal is generating to the solenoid.

16. A sensing system for use with a fuel system, the sensing system comprising:
a fuel tank isolation valve (FTIV) configured for being disposed in fluid flow communication with a fuel tank and a carbon canister of a fuel system, said FTIV comprising:
an integrated controller; and
a solenoid coupled to a valve;
wherein the solenoid is movable between a normally closed position in which the valve is closed and prevents fluid communication through a first flowpath through the FTIV, and an open position in which the valve is open and allows for fluid communication through said first flowpath;
wherein said integrated controller is configured for generating actuation signals to the solenoid responsive to parameter signals received from one or more sensors associated with the fuel tank; and
at least one of said one or more sensors that is associated with the fuel tank of the fuel system,
wherein at least one of said one or more sensors comprises a fuel tampering sensor configured for generating said parameter signal in the form of a fuel tampering parameter signal corresponding to a refueling event with incorrect fuel, said fuel tampering sensor configured for transmitting said fuel tampering parameter signal to said integral controller of the FTIV responsive to an incorrect fuel being provided to the fuel tank, wherein responsive thereto said integral controller provides a closing signal to the solenoid of the FTIV, whereupon to terminate refueling.

17. The sensing system according to claim 16, including at least one of the following:
wherein said fuel tampering sensor comprises an optical sensor configured for measuring at least one fuel parameter chosen from the group including: color, transparency, light reflection qualities; wherein said fuel tampering sensor is further configured for comparing said at least one fuel parameter with a datum range of values for the corresponding fuel parameter of the correct fuel, and for providing said closing signal responsive to said at least one fuel parameter being outside said datum range of values;

wherein said fuel tampering sensor comprises an acoustic sensor configured for measuring at least one fuel parameter including at least one of: fuel density or sound reflection qualities; wherein said fuel tampering sensor is further configured for comparing said at least one fuel parameter with a datum range of values for the corresponding fuel parameter of the correct fuel, and for providing said closing signal responsive to said at least one fuel parameter being outside said datum range of values;

wherein said fuel tampering sensor comprises an ultrasonic sensor; or wherein the sensing system is further configured for generating an alert signal at a user interface, responsive to said fuel tampering parameter signal being transmitted to said integral controller of the FTIV.

18. A fuel system, comprising:
the fuel tank;
the carbon canister; and
the sensing system of claim 5 for use with the fuel tank and the carbon canister, the sensing system including the FTIV of claim 1 and disposed in fluid flow communication with the fuel tank and the carbon canister.

19. The fuel system according to claim 18, further comprising a central controller configured for providing an opening signal to said integral controller to thereby cause the solenoid to move to the open position in response thereto, wherein said actuation signals are configured for overriding said opening signal and thereby cause the solenoid to move to the open position.

20. The fuel system according to claim 19, including at least one of the following:
wherein the central controller is provided by a vehicle in which the fuel system is fitted;
wherein said central controller is configured for providing said opening signal to said FTIV upon commencing a refueling procedure for the fuel system;
wherein said central controller is configured for performing target pressure checks within the fuel system;
wherein said opening signal is generated responsive to a predetermined action by a user, whereby to enable said solenoid to move to the open position thereby enabling reduction of pressure within the fuel tank prior to a fuel cap of the fuel system being removed; or
wherein said opening signal is generated responsive to a predetermined action by a user, whereby to enable said solenoid to move to the open position thereby enabling reduction of pressure within the fuel tank prior to a fuel cap of the fuel system being removed, and, wherein said predetermined action includes at least one of: a suitable command switch being opened; the fuel cap door that normally covers the fuel cap being opened.

21. A vehicle comprising the fuel system of claim 18.

* * * * *